No. 772,588. PATENTED OCT. 18, 1904.
J. S. TINDALL.
AUTOMATIC INDICATOR FOR SCALES.
APPLICATION FILED APR. 18, 1904.
NO MODEL. 2 SHEETS—SHEET 1.
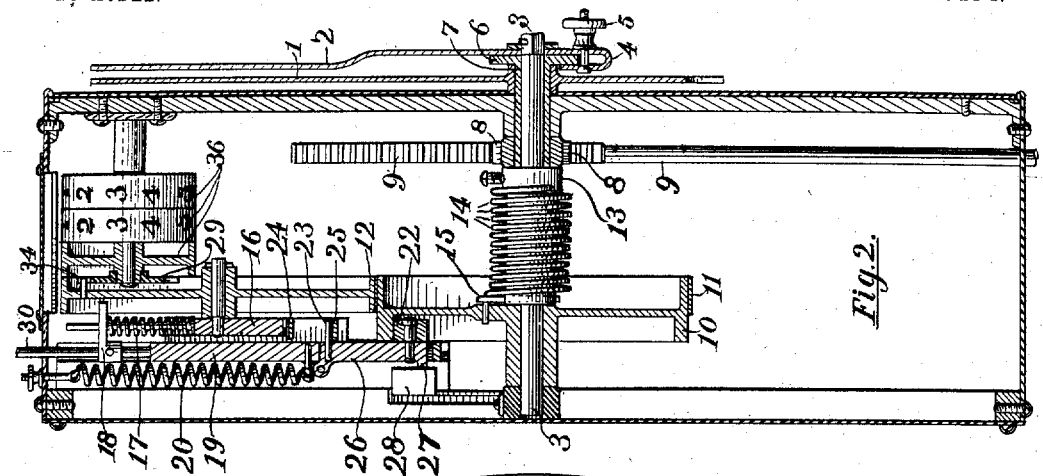
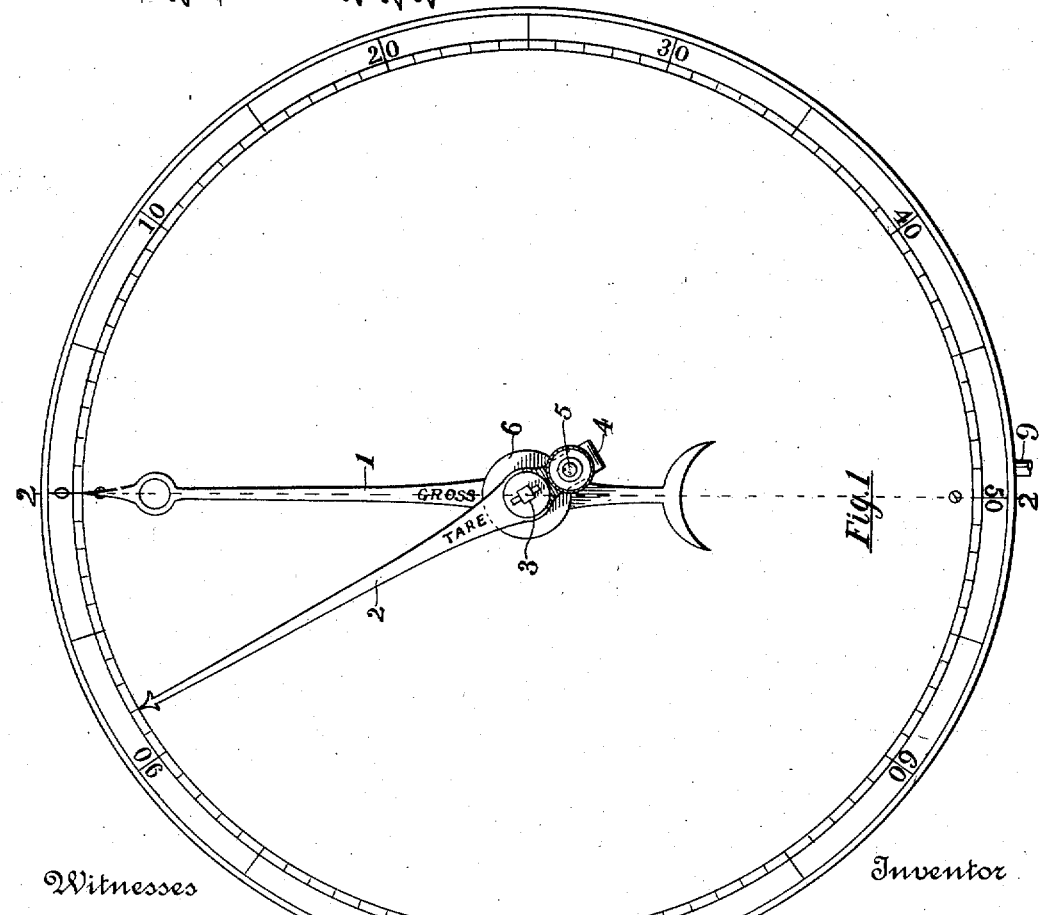
Witnesses
Edward R. Monre
Georgiana Chase
Inventor
Joseph S. Tindall
By Luther V. Moulton
Attorney No. 772,588. PATENTED OCT. 18, 1904.
J. S. TINDALL.
AUTOMATIC INDICATOR FOR SCALES.
APPLICATION FILED APR. 18, 1904.
NO MODEL. 2 SHEETS—SHEET 2.
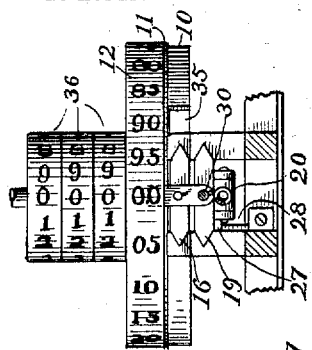
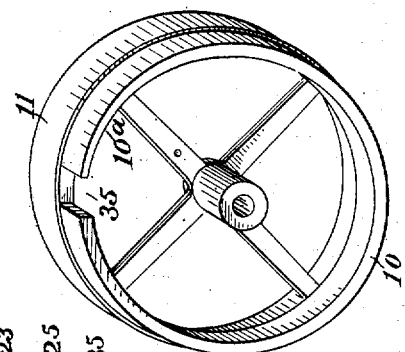
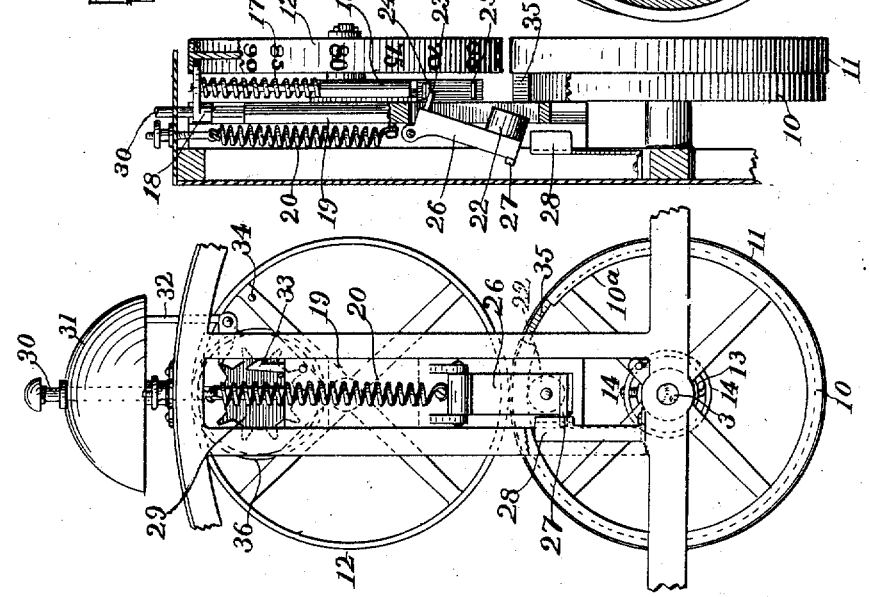
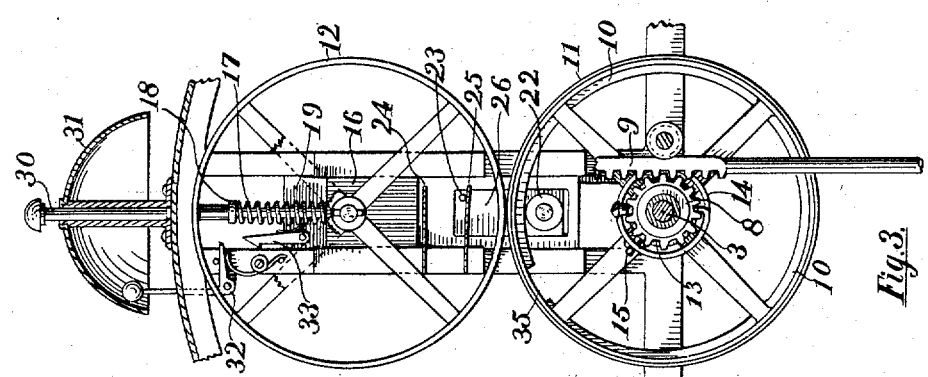
Witnesses
Edward P. Monroe
Georgiana Chace
Inventor
Joseph S. Tindall
By Luther V. Moulton
Attorney No. 772,588.

Patented October 18, 1904.

UNITED STATES PATENT OFFICE.

JOSEPH S. TINDALL, OF EVANS, MICHIGAN.

AUTOMATIC INDICATOR FOR SCALES.

SPECIFICATION forming part of Letters Patent No. 772,588, dated October 18, 1904.

Application filed April 18, 1904. Serial No. 203,535. (No model.)

*To all whom it may concern:*

Be it known that I, JOSEPH S. TINDALL, a citizen of the United States, residing at Evans, in the county of Kent and State of Michigan, have invented certain new and useful Improvements in Automatic Indicators for Scales; and I do hereby declare the following to be a full, clear, and exact description of the invention, such as will enable others skilled in the art to which it appertains to make and use the same.

My invention relates to improvements in automatic indicators for scales; and its object is to provide means for automatically indicating the gross and net weight placed upon the scales and for successively adding the net weight of a series of articles placed upon the scales, to at any time indicate the sum of such weights placed in succession on the scales, to avoid interfering with the correct action of the scales, and to provide the device with various new and useful features hereinafter more fully described, and particularly pointed out in the claims.

My invention consists, essentially, of a device adapted to be attached to scales and to be operated thereby, and it comprises a rotary shaft operated by the movement of the scales, an index mounted on a sleeve adjustable on the shaft and traversing a dial to indicate the gross weight, a second index fixed on the shaft and adjustable relative to the sleeve to indicate the tare to be deducted from the gross weight, a wheel journaled on the shaft, a projection fixed on the shaft to turn the wheel in one direction, a spring connecting the shaft and wheel to turn the wheel in the opposite direction, a counter-wheel engaged by the wheel on the shaft and rotated thereby, and means for automatically disengaging the said wheels when the tare-index is opposite the zero-mark on the dial, and in the various details of construction and arrangement hereinafter more fully described, reference being had to the accompanying drawings, in which—

Figure 1 is a front elevation of a device embodying my invention and showing the indexes adjusted for tare; Fig. 2, a vertical section of the same on the line 2 2 of Fig. 1; Fig. 3, a detail of a part of the mechanism shown in front elevation; Fig. 4, the same shown in rear elevation; Fig. 5, a detail with the wheels disconnected; Fig. 6, a perspective detail of the operating-wheel; Fig. 7, a detail in plan view.

Like numerals refer to like parts in all of the figures.

1 is the index to indicate on the dial the gross weight on the scale; 2, an adjustable index to indicate the amount of tare to be subtracted from the gross weight as occasion may arise; 3, the main shaft of the device on which the index 2 is fixed; 4, a clamp formed by folding the rear end of the index 2 and engaging the flange 6 on the sleeve 7 and operated by a thumb-screw 5 to adjust the shaft 3 and index 2 relative to the sleeve 7; 8, a pinion fixed on the sleeve to rotate the sleeve and shaft and operated by a rack 9, reciprocated by the scales to which the device is attached; 10, a wheel journaled on the shaft 3, being freely rotated thereon and provided with a suitable friction-surface 11, made of rubber or other proper material, to engage and rotate the large counter-wheel 12. The wheel 10 is positively rotated when the rack is moved downward by means of a suitable pin or projection 15, fixed in the shaft and engaging one side of the end of the spring 14 near where said spring is connected to said wheel. Said spring 14 is coiled around the shaft a suitable number of times and has one end attached to the wheel 10 and its other end attached to an adjustable collar 13, which collar rotates with the shaft and adjusts the tension of the spring. The wheel 12 is journaled on a stud in a vertically-movable slide 16, which slide is pressed downward by a spring 17 to bring the wheel 12 in contact with the wheel 10. Said spring is engaged at its upper end and compressed by an arm 18, attached to a push-rod 30, mounted on a second slide 19, which slide is moved upward by a contractile spring 20 attached thereto. In a suitable opening in this slide is an arm 26, pivoted at its upper end to swing backward and away from the wheel 10 at its lower end and extends alongside the upper portion of said wheel when in vertical position. On the lower end of this arm 26 is journaled a roll 22, adapted to engage the inner surface of the overhanging rim of the wheel 10 and thus hold the slide 19 in lowered position against the contractile force of the spring 20. This rim is provided with an opening 35 of a width just equal to the diameter of the roll 22 and adapted to permit the roll to pass therethrough. Adjacent to this opening the inner surface of the wheel-rim is slightly eccentric, as at 10ª, whereby the tension of the spring 20 tends to assist in rotating the said wheel. On the lower end of the arm 26 is a lateral projection 27, which when the arm is vertical traverses the front side of a suitable guide 28 to hold the roll 22 in engagement with the rim of the wheel 10. In the arm 26 and near the hinge of the same is a forwardly-projecting pin 23, which when the slide 19 is in lower position engages a spring 25 to hold the arm vertical, and when in raised position engages the spring 24 to swing the arm rearward.

29 is a spur-wheel having ten teeth, and attached to the first is a series of wheels 36, numbered from "1" to "10" consecutively and connected in the usual way, so that one revolution of each wheel will move the succeeding wheel one-tenth of a revolution. This spur-wheel 29 is moved one point, or one-tenth of a revolution, at each revolution of the wheel 12 by means of a pin 34, and the wheel 12 is numbered from "0" to "100," or whatever other number of pounds the dial shown in Fig. 1 is adapted to indicate, and the wheels 11 and 12 are of equal diameter. To depress the slide 19, a push-rod 30 extends upward therefrom, and surrounding this rod is a tubular standard on which is mounted a bell 31.

32 is a spring-actuated striker for the bell, which striker is operated by means of a hook 33, mounted on the slide 19.

The operation of my device is as follows: The basket, box, or other article the weight of which is to be deducted from the total weight at each operation of the machine is first placed upon the scales to which the machine is attached. The indexes will turn to the weight of the same, and the index 2 is then adjusted to zero on the dial and fixed in its position relative to the other index by means of the clamp 4. The opening 35 in the wheel-rim is normally opposite the index 2, and when said opening is at the top of the wheel it will permit the roll 22 to pass therethrough. Whatever is to be weighed (potatoes, for illustration) may now be placed in the receptacle and both placed on the scales. The index 1 will then turn to the gross weight of the basket and contents and the index 2 will indicate the net weight of the potatoes, the parts operating the indicator or counter being in the position shown in Fig. 5. The operator now manually depresses the slide 19 by means of the rod 30. The hook 33 will engage the striker 32 and as it descends will slip off the same and allow the striker to recoil against the bell, thus sounding an alarm to indicate that the indicator mechanism has been set. As the slide 19 is depressed the projection 27 will traverse the rear of the guide 28 and passing below the same the engagement of the spring 25 with the pin 23 will swing the arm 26 toward the wheel 10 and engage the roll 22 with the inner surface of the wheel-rim. The basket and contents now being removed from the scales, the rack 9 will rise and quickly rotate the shaft and sleeve back to normal position, turning the index 1 to zero on the dial. The projection 15 will turn with the shaft and leave the spring 14. The wheel 10 will follow under the moderate stress of the spring 14 alone, and thus any slipping of the wheels 10 and 12 will be avoided and the wheel 12 will be rotated by the wheel 10 until the end of the spring again contacts the projection 15. In the meantime when the index 2 reaches the zero-point on the dial it will have traversed so much of the same as indicates the net weight of the contents of the basket and no more, and the roll 22 will at this point rise into the opening 35 and the spring 20 will raise the slide 19, together with the arm 18, which arm will engage the inner surface of the wheel-rim 12, and thus lift the wheel clear of the operating-wheel 10 and at the same time serve as a friction-brake to prevent any further rotation of said wheel 12. When the slide 19 is again depressed, the wheel 12 again contacts the wheel 10 at the same point on the surface of the wheel 12, and the rotation of the wheel 10 will again turn the wheel 12 by just so much as is proper to indicate the next succeeding net weight of the contents of the basket, be it more or less, and the process may thus be continued indefinitely until, for instance, an entire car-load has been weighed, and the numbers on the wheels 12 and 36 will at all times indicate the total amount of the net weight of all that has been successively weighed on the scales to which the device is attached. It will be particularly noted that when the weight is taken by the scales the wheel 10 is out of contact with the wheel 12 and the roll 22, and there is thus no obstruction to its free rotation. Thus the device does not in any way interfere with the accurate working of the scales. It will also be noted that when the weight has been accurately determined the indicating mechanism is operated by the spring 14, which can be adjusted to operate the same gently and without risk of any inaccuracies due to slipping of the wheels 10 and 12 upon each other. Furthermore, when out of action the tension is taken off both of the springs 17 and 20, and thus the same do not deteriorate, as they are only momentarily under any stress.

It is obvious that various modifications of structure, especially in the indicating mechanism, may be adopted without materially departing from the invention, which consists substantially of the means herein shown for moving the indicating-wheels of a suitable counter forward at each operation of the scale by an amount equal to the net weight placed thereon.

I claim—

1. The combination of a reciprocating member, a counter-wheel rotated by contact with said member, yielding means for normally holding the counter-wheel out of contact with the reciprocating member, and adjustable means for forcing the counter-wheel into contact with said member, during the return stroke of the reciprocating member less a portion of the same determined by such adjustment.

2. The combination of a reciprocating member adapted to be operated in conjunction with a scale, a counter or indicator having a wheel rotated in one direction only by contact with the said member, manually-operated means for engaging the said wheel and member, and means for automatically disengaging the same.

3. The combination of a reciprocating member, a slide movable toward and from said member, a counter-wheel journaled on the slide, means for holding the counter-wheel in contact with the reciprocating member during a portion of the movement of the same in one direction, and means for holding the counter-wheel out of contact with the same during the movement of same in the other direction.

4. The combination of a reciprocating member adapted to be operated by the movement of a weighing-scale, a counter-wheel engaging the reciprocating member and rotated thereby, manually-operated means for so engaging the counter-wheel, and means operated by the reciprocating member to hold the counter-wheel in such engagement and to release the same at a predetermined point in the movement of the reciprocating member.

5. The combination of a reciprocating member operated by a scale and having an opening, a counter-wheel, means for holding the counter-wheel in contact with the reciprocating member, said means having a roll engaging the said member and adapted to escape through the opening and release the counter-wheel from contact with said member.

6. The combination of a reciprocating wheel having an opening in its rim, a counter-wheel, a slide supporting the same, a spring engaging the slide, a second slide, a spring to move the same, an arm pivoted on the second slide, a roll on the arm to engage the reciprocating wheel, a rigid arm attached to the second slide and adapted to engage the first-named spring, and also adapted to engage the counter-wheel, and move the same away from the reciprocating wheel.

7. The combination of a shaft having a reciprocating rotary motion, a wheel journaled on the shaft, a projection on the shaft to positively rotate the wheel in one direction a spring connecting the wheel and shaft to rotate the wheel in the opposite direction, a counter-wheel rotated by the reciprocating wheel, and means for temporarily engaging the counter-wheel with the reciprocating wheel during a predetermined portion of the return movement of the same.

8. The combination of a shaft having a reciprocating rotary motion, a wheel journaled on the shaft and having an opening in its rim, a projection on the shaft to positively rotate the wheel in one direction, a spring connected to the wheel and shaft to rotate the wheel in the opposite direction, a counter-wheel rotated by the wheel on the shaft and normally out of contact therewith, a roll engaging the rim of the wheel on the shaft to hold the counter-wheel in contact therewith, and adapted to pass through the said opening, and a spring to move the counter-wheel away from the wheel on the shaft.

9. The combination of a reciprocating wheel having an opening in its rim, a counter-wheel, a slide on which the counter-wheel is journaled, a spring engaging the slide, a second slide carrying an arm engaging the spring at one side and the rim of the counter-wheel at the other side, a spring to move the second slide away from the reciprocating wheel, an arm pivoted to the second slide, a roll on the arm to engage the rim of the reciprocating wheel and enter the opening in the same, a pin in the pivoted arm, springs engaging the pin to move the arm, and a push-rod connected to the second slide to move the same toward the reciprocating wheel.

10. The combination of a reciprocating wheel having an opening in its rim, a counter-wheel rotated by the said wheel, a slide having an arm adapted to move the counter-wheel toward and from the reciprocating wheel, an arm pivoted to the slide, a roll on the arm to engage the rim of the wheel to pass through the opening of the same, a projection on the arm, a guide-plate engaging the projection and traversed by the same, a pin in the arm, springs oppositely engaging the pin to turn the arm on its pivot, and means for moving the slide toward the reciprocating wheel.

11. The combination of a shaft, a sleeve journaled on the shaft and having a flange, a dial, an index fixed on the sleeve, an index fixed on the shaft, a clamp to adjust and hold the last-named index against the flange, means for connecting the sleeve to scales to impart a reciprocating rotary motion to the sleeve and shaft, a wheel journaled on the shaft, a projection on the shaft to positively rotate the wheel in one direction, a spring connected to the wheel and shaft to rotate the wheel in the opposite direction, a counter-wheel rotated by the wheel on the shaft, and means for holding the counter-wheel temporarily in contact with the wheel on the shaft during the return movement of the same, less that portion of said movement, corresponding to the angular distance between the two indexes.

12. The combination of a shaft having a reciprocating rotary motion, a dial, an index fixed on the shaft, an index adjustable on the shaft, a wheel journaled on the shaft and having an opening in its rim in fixed relation to one index, a counter-wheel journaled on a movable support, and means for temporarily engaging the counter-wheel with the wheel on the shaft, said means adapted to pass through said opening and disengage the counter-wheel, when the fixed index is opposite the zero-mark on the dial.

13. The combination of a dial, a reciprocating, rotary shaft adapted to be operated by scales, a sleeve rotative on the shaft, a flange on the sleeve, an index fixed on the sleeve, an index fixed on the shaft and having one end folded over the edge of the flange, and a binding-screw in the folded end of the index.

14. The combination of a dial, a reciprocating, rotary shaft adapted to be operated by scales, an index fixed on the shaft, an index adjustable on the shaft, a wheel on the shaft, a counter-wheel rotated by contact with the wheel on the shaft, means for temporarily maintaining contact of said wheels, said means also being adapted for releasing said contact whenever the fixed index is opposite the zero-mark on the dial.

15. The combination of a reciprocating member adapted to be operated by scales, a counter-wheel rotated by contact with said member, a manually-operated slide to move the wheel into contact with said member, means for maintaining said contact, said means also being adapted for automatically releasing said contact, a bell, a spring-actuated striker for the bell, and a hook connected to the slide, and operating the striker when the slide is moved.

In testimony whereof I affix my signature in presence of two witnesses.

JOSEPH S. TINDALL.

Witnesses:
LUTHER V. MOULTON,
EDWARD R. MONROE.